(12) United States Patent
Albaran et al.

(10) Patent No.: US 9,315,162 B2
(45) Date of Patent: Apr. 19, 2016

(54) CONDUIT FOR RECEIVING ELONGATE ELEMENTS, METHOD FOR MOUNTING SAME, AND ASSEMBLY COMPRISING A MOUNTING AND SUCH A CONDUIT

(75) Inventors: Jean-François Albaran, Varces (FR); Ridha Bhiri, Grenoble (FR)

(73) Assignee: A. RAYMOND ET CIE, Grenoble (FR)

( * ) Notice: Subject to any disclaimer, the term of this patent is extended or adjusted under 35 U.S.C. 154(b) by 527 days.

(21) Appl. No.: 13/989,986

(22) PCT Filed: Nov. 22, 2011

(86) PCT No.: PCT/EP2011/070675
§ 371 (c)(1),
(2), (4) Date: May 31, 2013

(87) PCT Pub. No.: WO2012/076330
PCT Pub. Date: Jun. 14, 2012

(65) Prior Publication Data
US 2013/0249284 A1    Sep. 26, 2013

(30) Foreign Application Priority Data

Dec. 6, 2010    (FR) ..................................... 10 60134

(51) Int. Cl.
*H01B 17/00*    (2006.01)
*B60R 16/02*    (2006.01)
*B63B 13/00*    (2006.01)
*B60S 1/12*    (2006.01)

(52) U.S. Cl.
CPC ............. *B60R 16/0215* (2013.01); *B60S 1/125* (2013.01); *B63B 13/00* (2013.01); *Y10T 29/49826* (2015.01)

(58) Field of Classification Search
USPC ......................................... 307/10.1; 174/154
See application file for complete search history.

(56) References Cited

U.S. PATENT DOCUMENTS

| 4,494,719 A | * | 1/1985 | Guidicelli | ............... F16C 1/105 248/27.1 |
| 2006/0011381 A1 | * | 1/2006 | Zeuner | ................... B64C 1/406 174/154 |

FOREIGN PATENT DOCUMENTS

| DE | 8605411 U1 | 4/1986 |
| DE | 4447719 C2 | 2/1999 |
| DE | 102005015075 A1 | 10/2006 |
| DE | 202008005734 U1 | 7/2008 |

OTHER PUBLICATIONS

IPRP of International Application No. PCT/EP2011/070675 mailed Nov. 21, 2012.

* cited by examiner

*Primary Examiner* — Danny Nguyen
(74) *Attorney, Agent, or Firm* — Faegre Baker Daniels LLP

(57) ABSTRACT

A conduit is mountable to a mounting, such as the engine block of an automobile, and includes a body defining an area for receiving elongate elements, such as cables. A first locking member is stationary relative to the body, and a second locking member is mobile relative to the body. The movable locking member is capable of assuming an intermediate position, in which it defines, together with the body, a preliminary support space for the mounting. The conduit includes a locking feature capable of moving the movable locking member from the intermediate position to a locking position.

14 Claims, 3 Drawing Sheets

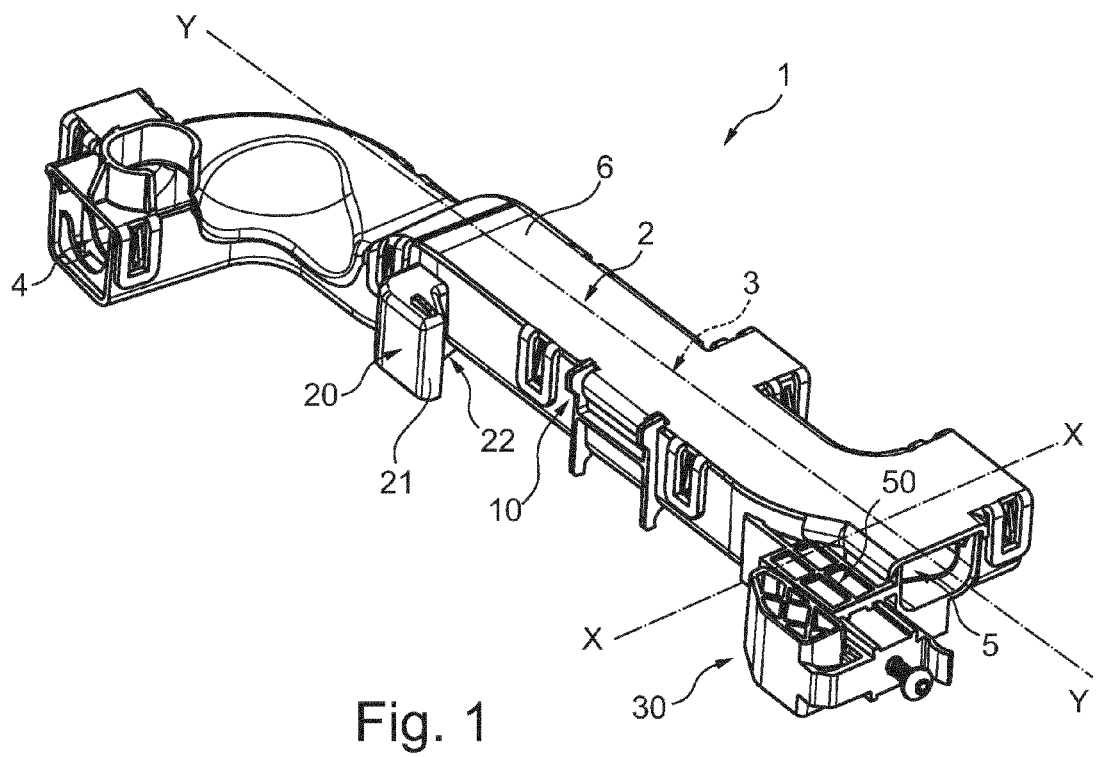
Fig. 1
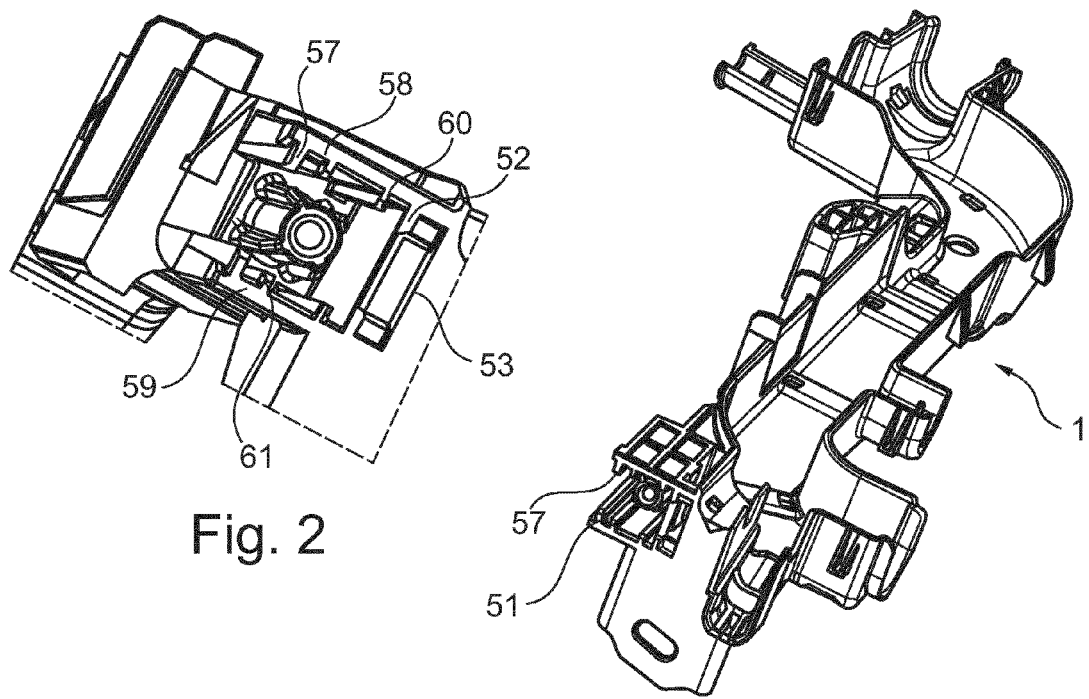
Fig. 2
Fig. 3

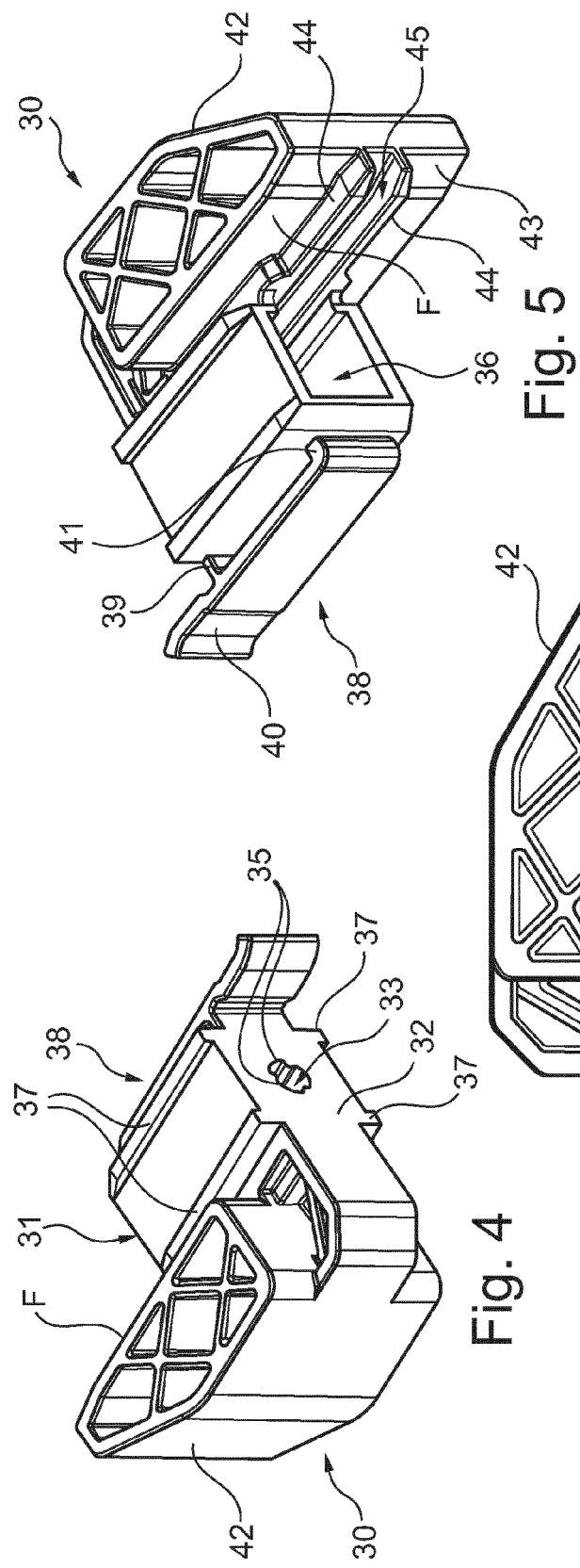
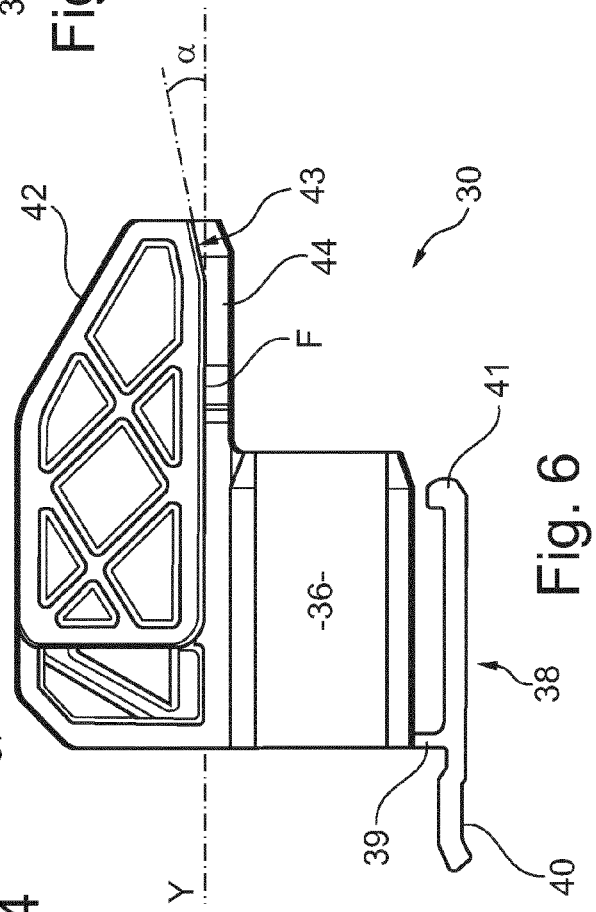

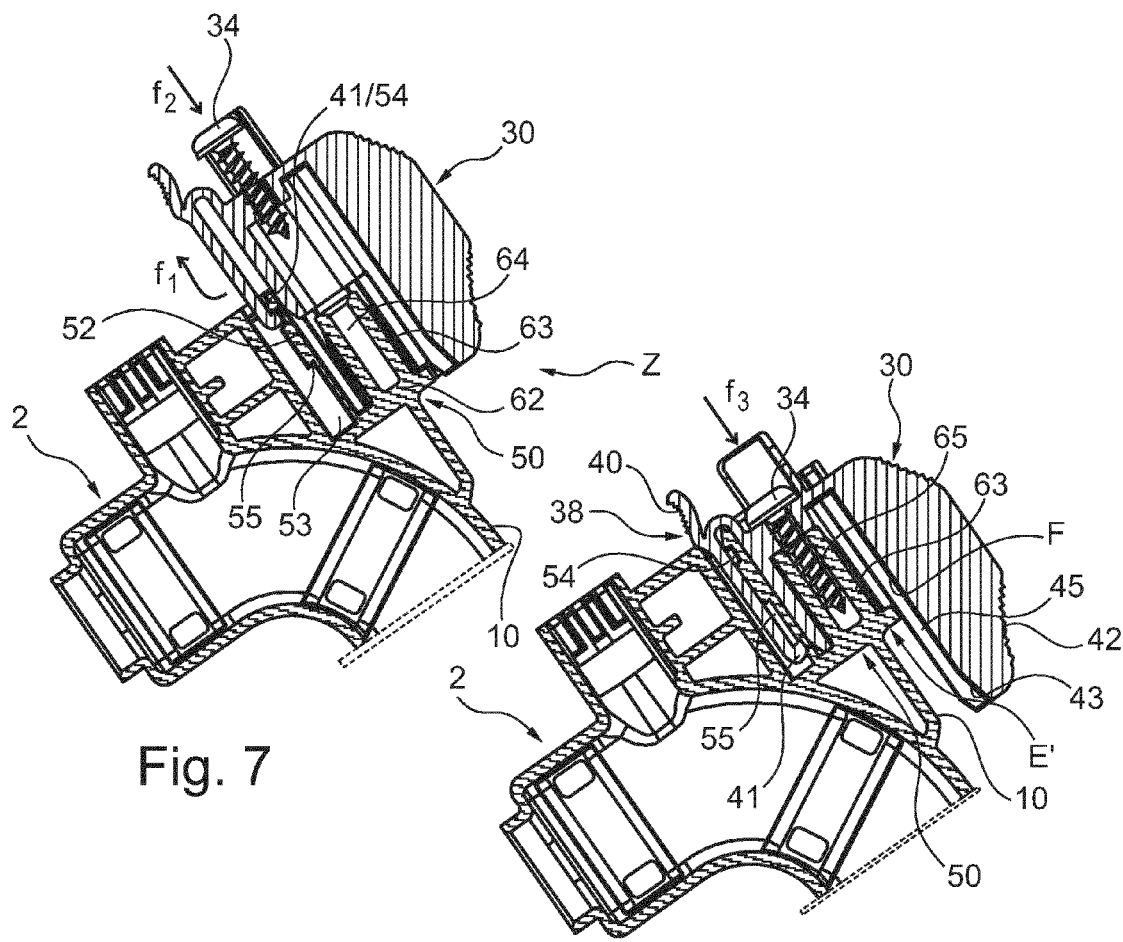
Fig. 7
Fig. 8
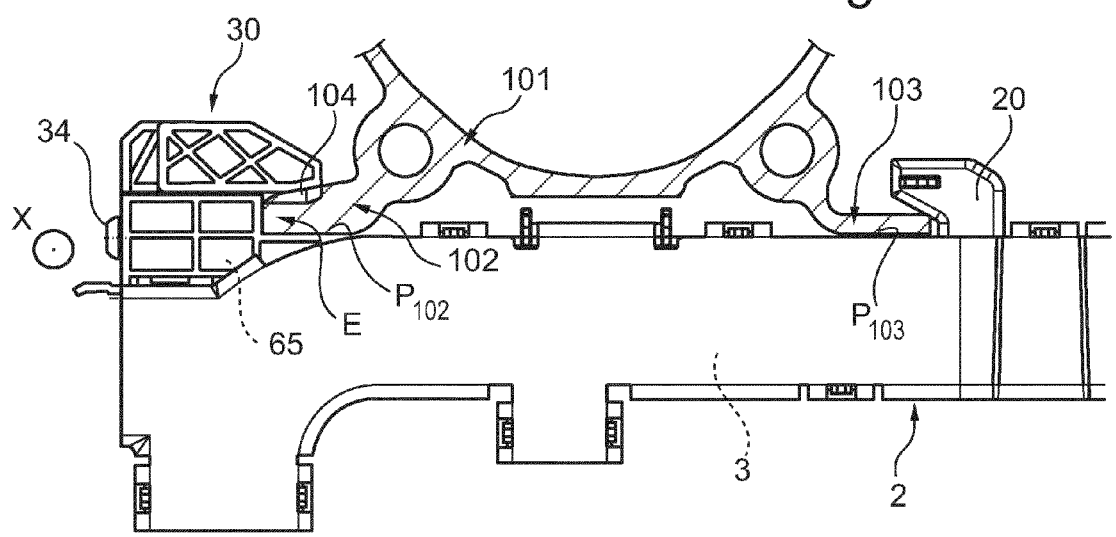
Fig. 9

CONDUIT FOR RECEIVING ELONGATE ELEMENTS, METHOD FOR MOUNTING SAME, AND ASSEMBLY COMPRISING A MOUNTING AND SUCH A CONDUIT

CROSS-REFERENCE TO RELATED APPLICATIONS

This application is a U.S. National Phase Patent Application based on International Application No. PCT/EP2011/070675 filed Nov. 22, 2011, which claims priority to French Patent Application No. 1060134 filed Dec. 6, 2010, the entire disclosures of which are hereby explicitly incorporated by reference herein.

BACKGROUND OF THE INVENTION

1. Field of the Invention

The present invention concerns a conduit for receiving elongate elements, a method for mounting same on a mounting, and an assembly comprising a mounting and such a conduit.

The invention applies more particularly to a conduit intended to be mounted on a mounting constituted by the engine block of a motor vehicle. In such a vehicle, many electrical wiring harnesses are positioned in the vicinity of the engine. It will therefore be appreciated that their integrity must be preserved, especially in order to prevent short-circuits.

2. Description of the Related Art

To achieve this end, it is known to house these electrical wiring harnesses in a conduit, which generally comprises an elongate body delimiting a receiving space for the harnesses. This conduit is further provided with means for fixing it to the engine.

Known from EP-A-1 367 308 is a device for fixing elongate objects to a flat mounting, which comprises, first of all, two support parts resting on said mounting. These two parts, which are slidably connected to each other, further support two half-cradles for receiving elongate objects.

This known solution carries certain disadvantages, however, in that it applies exclusively to flat mountings having specific edges. In addition, there must be enough room on each side of the mounting for the operator to be able to manipulate the support parts correctly. This is found to be inconvenient when the device has to be installed in a small space. Finally, only plastic catches are used to immobilize the elongate objects, so said objects can detach over time, particularly in the presence of high stresses, due, for example, to vibration.

US-A-2006/011381 describes a conduit for mounting ducts and tubes that is intended for use in airplanes. This conduit has a base body provided with a cut-out to receive a slidably mounted immobilizing element.

In that arrangement, the movable immobilizing element is not locked when it is not being guided. That is, only the final positioning of this element is assured, when it is at the end of its travel. Furthermore, the retention provided by a mounting of this kind is not the positive type, so it is not long-lasting, especially in cases where the mounting or the conduit is subject to high stress.

Finally, DE 20 2008 005 734 describes a conduit comprising a body provided with a first, fixed element that serves to immobilize the conduit relative to the mounting on which it is to be mounted. Also provided is an insert that is slidably mounted in relation to the body, which is equipped with a second locking element that is consequently movable in relation to the body. Catches are used to lock the body and the insert together. Such a conduit can be mounted on different-sized mountings.

This latter solution also has its limitations, related in particular to the use of catches. This does not completely eliminate the risk of untimely separation. In addition, this type of connection does not place the resulting assembly under tension, and it is therefore impossible to provide a positive lock.

SUMMARY OF THE INVENTION

The present invention is aimed at correcting the various above-cited disadvantages of the prior art, and, in particular, at proposing a conduit that is capable of being interconnected with a mounting in a reliable and lasting manner, even when the mounting is installed in an environment that is subject to strong vibration, such as a vehicle engine. The invention is also aimed at proposing a conduit of this kind that can be mounted quickly and easily to the aforesaid mounting.

To this end, the invention is directed to a conduit intended to be mounted on a mounting, particularly the engine block of a motor vehicle, said conduit including a body defining a receiving area for elongate elements, particularly in the nature of cables, a first immobilizing member to effect immobilization on the mounting, which member is fixed in relation to the body, and a second immobilizing member to effect immobilization on the mounting, which member is movable in relation to the body between a retracted position for situating the mounting and an advanced position for immobilizing the mounting, wherein said movable member defines an immobilizing space with the body, characterized in that the movable immobilizing member is capable of assuming an intermediate position in which it defines, with the body, a preliminary retention space for the mounting, the conduit comprising locking means capable of moving the movable immobilizing member from its intermediate position to its locking position.

A conduit according to the invention can advantageously have one or more of the following features:

- The immobilizing member can be moved from its retracted position to its intermediate position by a single axial action, particularly a manual such action.
- The locking means comprise externally threaded means.
- The externally threaded locking means comprise at least one externally threaded element that is interconnected with or is capable of being interconnected with a given one of the movable member and the body, together with at least one internally threaded element that is interconnected with or capable of being interconnected with the other one of the movable member and the body, said internally threaded element being capable of cooperating with a corresponding externally threaded element to move the movable member in relation to the body.
- Arresting means are provided for arresting the movable member both in its refracted position and in its intermediate position.
- The arresting means include a lug with which the movable member is equipped and which is capable of cooperating with a first and a second catch on the body that respectively correspond to the retracted and intermediate positions.
- The lug is carried by a lever of the movable member, said lever having an actuating end capable of disengaging the lug from the first catch to permit the movement of the movable member toward the intermediate position.
- The movable immobilizing member is capable of moving in a longitudinal direction of movement and said movable member has a support end bearing against the mounting and forming with said direction a draft angle of between 0 and 45° that is strictly positive, preferably of between 5 and 10°.

Transverse positioning means are provided for positioning the movable immobilizing member transversely with respect to the mounting.

The transverse positioning means comprise a positioning channel formed on the movable member and capable of cooperating with a rib provided on the mounting.

The invention is also directed to a method for mounting the above conduit on a mounting, wherein one places the conduit against the mounting substantially in the final position it is to assume, while simultaneously maintaining the movable member in its retracted position; one pushes the movable member backward to its intermediate position to maintain the conduit and the mounting in relation to each other; and one actuates the locking means to move the movable member into its locking position, thereby immobilizing the conduit with respect to the mounting.

Finally, the invention is also directed to an assembly comprising a mounting and a conduit as above, said conduit being mounted on said mounting.

According to an advantageous characteristic, the mounting comprises complementary transverse positioning means that cooperate with the transverse positioning means of the movable immobilizing member.

In one form thereof, the present invention provides a conduit intended to be mounted on a mounting, particularly the engine block of a motor vehicle, the conduit including a body defining a receiving area for elongate elements, particularly in the nature of cables, a first immobilizing member to effect immobilization on the mounting, which member is fixed in relation to the body, and a second immobilizing member to effect immobilization on the mounting, which member is movable in relation to the body between a retracted position for situating the mounting and an advanced position for immobilizing the mounting, wherein the movable member defines an immobilizing space with the body, characterized in that the movable immobilizing member is capable of assuming an intermediate position in which it defines with the body a preliminary retaining space for retaining the mounting, the conduit including locking means capable of moving the movable immobilizing member from its intermediate position to its immobilizing position.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein:

FIG. 1 is a perspective view illustrating a conduit according to the invention;

FIGS. 2 and 3 are perspective views illustrating, at two different angles, a retaining base for a bolt belonging to said conduit;

FIGS. 4 and 5 are perspective views illustrating, at two different angles, a bolt belonging to said conduit;

FIG. 6 is a side view illustrating the bolt of FIGS. 4 and 5;

FIGS. 7 to 8 are longitudinal sectional views illustrating the bolt mounted on its base, respectively first in a retracted position, then in an intermediate position, and finally in an immobilized position on a mounting; and FIG. 9 is a side view illustrating the locked position of the conduit.

Corresponding reference characters indicate corresponding parts throughout the several views. Although the exemplifications set out herein illustrate embodiments of the invention, the embodiments disclosed below are not intended to be exhaustive or to be construed as limiting the scope of the invention to the precise forms disclosed.

DETAILED DESCRIPTION

The various figures illustrate a conduit according to the invention, denoted as a whole by reference 1, which is to be mounted on a mounting 101. The latter, which can be seen in more detail in FIG. 9, is a motor-vehicle engine block in the example illustrated. However, the invention is also applicable to other types of mountings, such as, for example, metal profiles, particularly having a T or H shape.

The mounting 101 is provided with two ears 102 and 103, which define two support planes $P_{102}$ and $P_{103}$ for affixing the conduit, as will be seen hereinafter. In addition, one 102 of these ears is provided with a rib 104 for positioning the conduit and the mounting in relation to each other, as will also be explained later on.

In the example illustrated, the conduit 1 is essentially produced by molding thermoplastic materials on injection presses. It has an elongate body 2, whose main direction Y will be noted. This body, which is U-shaped overall, defines a receiving area 3 for elongate elements, particularly in the nature of cables, which exit to the outside through two openings 4 and 5 that form an inlet and an outlet or vice versa. Ordinarily, the function of this conduit is to shield these elongate elements from attack, such as wires becoming caught on each other or the incursion of liquids.

In the example illustrated, the receiving area 3 is covered by a lid 6. The latter is optional, however, and can be replaced with any means by which the harnesses can be secured in relation to the conduit, particularly adhesive such means.

The conduit is provided with a front face 10, referred to as the fixing face, where the mounting to mounting 101 takes place. This fixing face 10, which extends in direction Y, is bordered by two immobilizing members 20 and 30, which will now be described in more detail.

The first member, or heel 20, is designated as fixed, to the extent that it is connected permanently and irremovably to the body 2, particularly being integrally molded therewith. This heel has a protrusion 21 which defines with the opposite face 10 a first space 22 that serves to immobilize the mounting in direction Y, as a first direction.

The second member, or bolt 30, is designated as movable, to the extent that it is mounted relative to the body with the capacity for axial travel, in direction Y. For this purpose, said bolt is supported by a base 50 interconnected with the body of the conduit, which base will be described in more detail with reference to FIGS. 2 and 3 and 7 to 9.

This base 50, forming the retaining member for the bolt 30, has an approximately parallelepipedal shape. It is pierced in such a way as to define an axial chamber 51, which is open opposite the heel 20, and of which a first wall 52, facing the body, defines therewith an intermediate space 53 (see FIG. 7). This wall 52 comprises a notch 54 disposed adjacent the outlet from the chamber and forming a first catch, at the same time possessing a shoulder 55 forming a second catch. It will be seen below that the presence of the intermediate space 53 permits additional advancement of the bolt.

Wall 57, opposite wall 52, is cut out to permit the passage of uprights provided on the bolt 30, as will be seen below.

Finally, the other two walls 58 and 59 of the chamber are equipped with internal ribs 60 and 61 to guide the movement of the bolt.

The chamber 51 has a bottom 62 from which extends axially a barrel 63 whose walls define a central space 64, permitting the insertion of a screw carried by the bolt. For this purpose, these walls are advantageously made of a soft plastic material, so that the screw can self-tap as it is inserted, in a manner known per se.

Referring henceforth primarily to FIGS. 4 to 6, the bolt 30 comprises a housing 31 whose outer profile substantially corresponds to the inner profile of the chamber 51. This housing has a bottom 32 comprising an opening 33 for the passage of a screw 34 (see FIG. 7), the perimeter of said opening being equipped with bosses 35. The latter serve to maintain the screw in relation to the housing when the bolt is not yet firmly secured on its base 50.

The housing is open opposite said bottom, delimiting a seat 36 for receiving the barrel 63. In addition, said housing is provided on two of its walls with guide rails 37 capable of cooperating with the aforesaid ribs 60 and 61.

A lever 38 extends from a third wall of said housing, via a hinge 39 created, for example, by thinning of material. This lever is provided at one end with an actuating tab 40, while its other end defines a lug 41 capable of cooperating with one or the other of the catches 54 and 55. This lug 41 has a rounded edge, facilitating the passage of the lever between the two catches.

Opposite the lever, the housing supports a heel 42, whose face F adjacent said housing extends in direction Y, as shown in FIG. 6. This face terminates in a drafted area 43 forming with direction Y an angle α of between 0 and 45° that is strictly positive, preferably of between 5 and 10°. This makes it possible to exert a force in direction X, i.e., transversely to the main direction of the conduit, which causes a bearing force of face F on plane $P_{102}$ of the mounting.

Two ribs or uprights 44, carried by face F of the heel 42, define a channel 45. The latter is capable of receiving the rib 104 provided on the mounting in order to position the latter satisfactorily with respect to the conduit. The free end of each of these uprights 44 is also slanted so as to be parallel to the drafted area 43.

The interconnection of the above-described conduit 1 and mounting 101 will now be specified in detail.

During its production and any shipping that may follow, the conduit is in the arrangement illustrated in FIG. 7. The bolt 30 assumes a retracted position, i.e., it leaves free an area Z bordered by the front face 10 and the base 50. This area Z, or latching area, corresponds to the location where the mounting is to be immobilized. In addition, the lug 41 is inserted in the notch 54, thereby ensuring that the bolt is maintained in this configuration.

To perform the mounting operation per se, the operator first inserts the ear 103 of the mounting 101 in the latching space 22, defined by the fixed heel 20. He then fits the second ear 102 against the edge of the front face 10, adjacent the base 50, i.e., at the level of area Z. During this operation, the rib 104 should be placed opposite the positioning channel 45.

Then, still holding the conduit 1 in this position with one hand, the operator presses on the tab 40 with the other hand to cause the lever 38 to pivot by elasticity around the hinge 39, as indicated by the arrow $f_1$, thereby releasing the lug 41 from the notch 54. Under these conditions, the operator can then push the bolt 30 back axially, in the direction indicated by arrow $f_2$, until said lug mates by elastic snap action with the second notch, defined by the shoulder 55. This movement also enables the uprights 44 to cover the rib 104, thereby positioning the conduit and the mounting in a transverse direction, denoted X in FIG. 9.

The bolt 30 is now in an intermediate position, illustrated in FIG. 8. It is henceforth disposed partially opposite face 10 of the body 2, thus creating with the latter a space E' designated the preliminary retaining space. Under these conditions, it is no longer necessary for the operator to hold up the conduit manually, so he can now, without risk, pick up a tool (not shown) such as a hand screwdriver.

Using this tool, the operator then goes ahead and tightens the screw 34 so that it penetrates into the walls of the barrel 63. As this operation proceeds, the screw taps its own hole, assigned reference 65 in FIG. 8. This causes an axial movement of the bolt relative to its base, as indicated by arrow $f_3$ in FIG. 8.

At the end of this movement, the drafted area 43 of the heel 42 bears against the ear 102, which helps to create a positive locking force of the bolt on the mounting. In this regard, it will be noted that the magnitude of this force is determined by the intensity of the tightening torque of the screw 34. The final immobilization space, defined between faces F and 10 belonging respectively to the heel and to the body, is denoted E.

The invention is not limited to the example described and shown. For instance, it can be provided that the screw does not cooperate with the soft walls of a barrel. In that case, the bottom 62 of the chamber 51 supports an externally threaded element that passes through the bottom 32 of the housing 31. A complementary internally threaded element attached to the end of the above externally threaded element can then be maneuvered by the operator to bring about the movement of the bolt relative to its base.

It can also be provided that the locking means do not involve externally threaded means.

The invention makes it possible to achieve the objects recited above.

To wit, first, it enables the conduit to be placed on the mounting in a particularly simple manner. As is apparent from the foregoing, the installer can easily arrange the conduit on the mounting with both hands, then shift the movable member by applying a low-intensity axial force. Then, thanks to the pre-assembly achieved in this way, it is easy for the installer to get hold of a tool to actuate the locking means.

Moreover, the invention permits satisfactory immobilization of the conduit on the mounting, thus ensuring that these two elements will remain lastingly connected even in an environment where strong vibrations are present. This is because the locking means, particularly threaded locking means, cause a positive force of the conduit on the mounting, thus preventing any untimely separation of the conduit when in use.

The provision of transverse positioning means for the conduit relative to the mounting is also advantageous. In this way, two elements can be mutually arranged with precision in a direction perpendicular to the direction of movement of the movable member.

It will be noted, in this regard, that the invention is also applicable to a conduit that comprises such transverse positioning means but is also equipped with a conventional movable immobilizing member, as described in the preamble to the present description. Such a movable member can be moved from its retracted position to its advanced position by means of simple catches, without having an intermediate position as described above and without being provided with locking means.

In this spirit, the invention therefore concerns a conduit intended to be mounted on a mounting, particularly the engine block of a motor vehicle, said conduit comprising a body defining a receiving area for elongate elements, particularly in the nature of cables, a first immobilizing member to effect immobilization on the mounting, which member is fixed in relation to the body, and a second immobilizing member to effect immobilization on the mounting, which member is movable in relation to the body between a retracted position for situating the mounting and an advanced position for immobilizing the mounting, wherein said movable member defines an immobilizing space with the body, said conduit further comprising means for transversely positioning the movable immobilizing member in relation to the mounting.

The conduit as just defined can thus have all the characteristics described in this specification, insofar as they are technically compatible.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A conduit for use in mounting to a substrate such as an engine block of a motor vehicle, said conduit comprising:
    a body defining a receiving area for elongate elements;
    a first immobilizing member fixed with respect to said body;
    a second immobilizing member movable with respect to said body between a retracted position and an advanced position, said second member defining an immobilizing space with said body;
    said second member positionable in an intermediate position, disposed between said retracted position and said advanced position, in which said second member defines with said body a preliminary retaining space; and
    a locking device capable of moving said second member from said intermediate position to said advanced position.

2. The conduit of claim 1, wherein said second member is manually movable from said retracted position to said intermediate position along an axial direction.

3. The conduit of claim 1, wherein said locking device comprises an externally threaded screw.

4. The conduit of claim 1, wherein said locking comprises:
    at least one externally threaded element associated with one of said second member and said body; and
    at least one internally threaded element associated with the other one of said second member and said body, said internally threaded element cooperating with said externally threaded element to move said second member with respect to said body.

5. The conduit of claim 1, further comprising an arresting device capable of arresting said second member in each of said retracted and intermediate positions.

6. The conduit of claim 5, wherein said arresting device comprises a lug associated with said second member, said lug cooperating with first and second catches on said body that respectively correspond to said retracted and intermediate positions.

7. The conduit of claim 6, wherein said lug is carried by a lever of said second member, said lever having an actuating end operable to disengage said lug from said first catch to permit movement of said second member toward said intermediate position.

8. The conduit of claim 1, wherein said second member is movable in a longitudinal direction and includes a support end forming with said longitudinal direction a draft angle ($\alpha$) of between 0° and 45°.

9. The conduit of claim 8, wherein said draft angle is between 0° and 45°.

10. The conduit of claim 1, further comprising a transverse positioning device locating said second member transversely with respect to a substrate.

11. The conduit of claim 10, wherein said transverse positioning device comprises a positioning channel formed on said second member and capable of cooperating with a rib provided on a substrate.

12. A method for mounting said conduit of claim 1 on a substrate, comprising the steps of:
    placing said conduit against the substrate substantially while simultaneously maintaining said second member in said retracted position;
    pushing said second member to said intermediate position to maintain said conduit and the substrate in relation to each other; and
    actuating said locking device to move said second member into said advanced position to immobilize said conduit with respect to the substrate.

13. An assembly comprising a motor vehicle engine block and said conduit of claim 1, said conduit mounted on said engine block.

14. The assembly of claim 13, wherein said conduit and said engine block include complementary transverse positioning devices.

* * * * *